United States Patent [19]

Speer et al.

[11] Patent Number: 5,811,027

[45] Date of Patent: Sep. 22, 1998

[54] METHODS AND COMPOSITIONS FOR IMPROVED INITIATION OF OXYGEN SCAVENGING

[75] Inventors: Drew Ve Speer; Thomas Andrew Blinka, both of Columbia; Michael Lee Becraft, Woodstock, all of Md.

[73] Assignee: W. R. Grace & Co.-Conn., Duncan, S.C.

[21] Appl. No.: 798,005

[22] Filed: Feb. 12, 1997

Related U.S. Application Data

[63] Continuation-in-part of Ser. No. 407,744, Mar. 21, 1995, abandoned.

[51] Int. Cl.$^6$ ............................ C09K 15/02; C09K 15/04
[52] U.S. Cl. .................................. 252/188.28; 428/35.3; 428/35.7; 428/411.1
[58] Field of Search ............................... 252/188.28, 397, 252/184, 189, 190, 191, 193; 428/411.1, 35.3, 35.7

[56] References Cited

U.S. PATENT DOCUMENTS

| | | | |
|---|---|---|---|
| 3,903,026 | 9/1975 | Fujimura et al. | 524/396 |
| 4,361,668 | 11/1982 | Lawson | 524/398 |
| 4,908,151 | 3/1990 | Inoue et al. | 252/188.28 |
| 5,211,875 | 5/1993 | Speer et al. | 252/188.28 |
| 5,286,407 | 2/1994 | Inoue et al | 252/188.28 |
| 5,305,948 | 4/1994 | Yoshikawa et al. | 228/205 |
| 5,648,020 | 7/1997 | Speer et al. | 252/188.28 |

FOREIGN PATENT DOCUMENTS

| | | |
|---|---|---|
| 0451762 | 10/1991 | European Pat. Off. . |
| 0640472 | 3/1995 | European Pat. Off. . |
| 2182334 | 5/1987 | United Kingdom . |

*Primary Examiner*—Joseph D. Anthony
*Attorney, Agent, or Firm*—Mark B. Quatt

[57] ABSTRACT

An improved method of initiating oxygen scavenging by compositions which comprise compounding oxidizable organic compounds and transition metal catalysts to form a composition suitable for forming into films or articles for packaging of oxygen sensitive products is disclosed. The method requires the addition of small amounts of a base to the oxygen scavenging composition as it is being compounded to improve the initiation properties and subjecting the film or article formed from the composition to actinic or electron beam radiation.

30 Claims, No Drawings

METHODS AND COMPOSITIONS FOR IMPROVED INITIATION OF OXYGEN SCAVENGING

This application is a continuation-in-part of U.S. application Ser. No. 08/407,744, filed Mar. 21, 1995 now abandoned.

FIELD OF THE INVENTION

The invention generally relates to compositions, articles and methods of scavenging oxygen in environments containing oxygen-sensitive products, particularly food and beverage products. As will be evident from the disclosure below, the term "oxygen scavenger" or "scavenger" refers to materials which consume, deplete or reduce the amount of oxygen from a given environment. It has been found that the incorporation of a base, such as calcium oxide, sodium carbonate, magnesium oxide, hydrotalcite (aluminum magnesium hydroxide carbonate) etc. into an oxygen scavenging resin when it is compounded into an oxygen scavenging composition will result in improved initiation properties of the resultant composition.

BACKGROUND OF THE INVENTION

It is well known that limiting the exposure of oxygen-sensitive products to 2 0 oxygen maintains and enhances the quality and "shelf-life" of the product. For instance, by limiting the oxygen exposure of oxygen sensitive food products in a packaging system, the quality of the food product is maintained, and food spoilage is avoided. In addition, such packaging also keeps the product in inventory longer, thereby reducing costs incurred from waste and having to restock. In the food packaging industry, several means for limiting oxygen exposure have already been developed. At present, the more commonly used means include modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, means for limiting oxygen exposure involves incorporating an oxygen scavenger into the packaging structure. Incorporation of a scavenger in the package can provide a uniform scavenging effect throughout the package. In addition, such incorporation can provide a means of intercepting and scavenging oxygen as it is passing through the walls of the package (herein referred to as an "active oxygen barrier"), thereby maintaining the lowest possible oxygen level throughout the package.

One example of an oxygen scavenger incorporated into an oxygen scavenging wall is illustrated in European Applications 301,719 and 380,319 as well as in PCT 90/00578 and 90/00504. See also U.S. Pat. No. 5,021,515. The oxygen scavenger disclosed in these patent applications comprises a transition metal catalyst and polyamide. Through catalyzed scavenging by the polyamide, the package wall regulates the amount of oxygen which reaches the interior of the package (active oxygen barrier). However, it has been found that the onset of useful oxygen scavenging by this wall, i.e. up to about 5 cubic centimeters (cc) oxygen per square meter per day at ambient conditions, may not occur for as long as 30 days. Such delayed onset of oxygen scavenging is not acceptable for many applications. The delay before the onset of useful oxygen scavenging is hereinafter referred to as the induction period.

In fact, other oxygen scavengers and walls which incorporate these scavengers may also exhibit an induction period. For instance oxygen scavengers comprising a transition metal catalyst and an ethylenically unsaturated compound, e.g. polybutadiene, polyisoprene, dehydrated castor oil, etc., may exhibit induction periods. These scavengers are disclosed in U.S. Pat. No. 5,346,644 and co-pending Ser. No. 08/276,125 filed on Jul. 15, 1994 for "Compositions, Articles and Methods for Scavenging Oxygen". When the oxygen scavenger comprises a polybutadiene, the induction period can exceed thirty days. Scavengers comprising polyisoprene or dehydrated castor oil typically have shorter induction periods, i.e. about fourteen- and one-day delays, respectively. As is evident, the duration of induction periods depends on several factors, some of which are not completely understood or controlled. Accordingly, when using oxygen scavengers having long induction periods, it will be required to keep the scavenger or oxygen scavenging layers and articles prepared therefrom in inventory prior to using them as scavengers in order to provide reliable scavenging behavior. On the other hand, when using scavengers having shorter induction periods, the layers and articles prepared therefrom will have to be prepared quickly and put to use in a short time period, sometimes immediately, or they would have to be stored in oxygen-free atmosphere which can be costly, in order to get the maximum effectiveness as a scavenger.

One method which could be employed to initiate scavenging on demand in packages for oxygen-sensitive foods involves incorporating photooxidizable rubber, i.e. cis-1,4-polyisoprene, and a photosensitizing dye into the inner surface of a package and then exposing it to visible light. See Rooney, M. L., "Oxygen Scavenging: A Novel Use of Rubber Photo-oxidation", *Chemistry and Industry*, Mar. 20, 1982, pp. 197–198. However, while this method initiates oxygen scavenging within minutes, and thus allows one to initiate oxygen scavenging when desired, it requires constant exposure of the package to light to maintain the scavenging effect. Even further, because a dye is involved, it would be difficult to employ this method for applications which require colorless packaging, especially the transparent and usually colorless packaging used with food and beverage products.

Another method of initiating oxygen scavenging by compositions which comprise oxidizable organic compounds and transition metal catalysts is disclosed in U.S. Pat. No. 5,211,875 issued to Speer et al. May 18, 1993, which is incorporated herein by reference as if set forth in full. The reference sets forth a method of initiating oxygen scavenging by administration of a dose of radiation.

Such oxygen scavenging compositions are conveniently prepared by compounding the scavenging resin(s), photoinitiators(s), transition metal catalyst and optionally a diluent resin(s). The compounding is normally accomplished using a twin screw extruder or the like. Oxygen scavenging compositions prepared in this fashion exhibit undependable initiation properties. In many instances, they have unpredicatable initiation periods or require a higher dose of radiation than expected.

It is highly desired to provide an oxygen scavenging composition which provides predictable initiation period and/or requires a prescribed dosage of radiation to cause initiation of scavenging activity.

SUMMARY OF THE INVENTION

It is thus an object of the invention to provide methods and novel compositions which are effective in controlling the scavenging properties of an oxygen scavenger composition and, thereby providing a means to initiate oxygen scavenging on demand.

It is also an object to employ these methods with compositions suitable for incorporation into films or articles capable of containing oxygen-sensitive products.

It is also an object to provide methods for initiating oxygen scavenging in a film or article containing oxygen-sensitive products, particularly food and beverage products.

The above-mentioned objects are obtained by an oxygen scavenging composition comprising an oxidizable organic compound, a transition metal catalyst, optionally a polymeric diluent, and a basic substance and to a method which comprises compounding the basic substance with the remaining components of the composition prior to exposing the composition to radiation, e.g. actinic or an electron beam. This method can be used on oxygen scavenger compositions used to form films, layers and multilayered articles, especially those used for packaging oxygen-sensitive products. This method can be used when irradiation takes place during or after fabrication of the film or article comprising the oxygen scavenger, as well as when radiation is employed before, during or after the packaging of the oxygen sensitive products.

A composition comprising (a) a substituted or unsubstituted ethylenically unsaturated hydrocarbon, (b) a transition metal catalyst, and (c) a basic substance is to be used under this method. The composition may further comprise polymeric diluents and conventional additives, processing aids, dyes and the like.

When the composition comprising (a), (b) and (c) above is used in forming a layer, such as a film, layer or novel articles for packaging oxygen-sensitive products, component (c) should be introduced into the composition during compounding of the composition. When using those articles formed by the method described herein, the resultant article regulates the oxygen exposure by acting as an active oxygen barrier means, for scavenging oxygen from within the article, or both in a more predetermined manner.

The above-mentioned goals and others will be apparent from the description that follows.

DESCRIPTION OF THE INVENTION

The method of this invention provides improved packaging articles used in a variety of fields. Packaging articles typically come in several forms including rigid containers, flexible bags, combinations of both, etc. Typical rigid or semi-rigid articles include plastic, paper or cardboard cartons or bottles such as juice containers, soft drink containers, thermoformed trays or cups which have wall thicknesses in the range of 100 to 1000 micrometers. Typical flexible bags include those used to package many food items, and will likely have thicknesses of 5 to 250 micrometers. The walls of such articles either comprise single or multiple layers of material.

The method of this invention can also provide improved packaging which has non-integral oxygen-scavenging components or layers, e.g., coatings, bottle cap liners, crown liners, can-end coatings, adhesive or non-adhesive sheet inserts, gaskets, sealants or fibrous mat inserts. Methods of employing oxygen scavengers in these applications are disclosed in U.S. Pat. Nos. 5,227,411 and 5,106,886.

The products which are packaged in such packaging articles include not only food and beverage (such as beer), but also pharmaceuticals, medical products, corrodible metals, photographs, electronic devices, etc.

In order to employ the method of this invention, the oxygen scavenger composition forming the resultant layer or packaging article should comprise oxidizable organic compounds. Such compounds include, but are not necessarily limited to, benzylic, allylic and/or tertiary hydrogen containing carbon compounds.

Specific compounds include polymers and copolymers of alpha-olefins. Examples of such polymers are low density polyethylene, very low density polyethylene, and ultra low density polyethylene; polypropylene; polybutylene, i.e., poly(1-butene); propylene copolymers; butylene copolymers; hydrogenated diene polymers; etc.

Suitable oxidizable compounds also include polyamides such as aromatic polyamides, e.g. meta-xylylene adipamide. Other suitable polyamides are disclosed in European Patent Application 301,719.

As mentioned above, it is particularly preferred to use a substituted or unsubstituted ethylenically unsaturated hydrocarbon with this invention. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule.

Preferred examples of unsubstituted ethylenically unsaturated hydrocarbons include, but are not limited to, diene polymers such as polyisoprene, polybutadiene (especially 1,2-polybutadienes, which are defined as those polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated).

Preferred substituted ethylenically unsaturated hydrocarbons include, but are not limited to, those polymers and copolymers with oxygen-containing moieties, such as esters, carboxylic acids, aldehydes, ethers, ketones, alcohols, peroxides, or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth) allyl (meth)acrylates.

The composition used may also comprise a mixture of two or more of the substituted or unsubstituted ethylenically unsaturated hydrocarbons described above.

It is most preferred to utilize polymeric compound(s) having three or more ethylenically unsaturated groups. The molecular weight of the oxidizable organic compound should be equal to or greater than 1,000 weight average molecular weight and preferably equal or greater than 10,000 weight average molecular weight.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is acceptable.

Transparent oxygen-scavenging layers and packaging articles prepared from 1,2-polybutadiene are especially preferred. For instance, those films exhibit transparency, mechanical properties and processing characteristics similar to those of polyethylene. In addition, these films retain their transparency and mechanical integrity even after most or all of its oxygen capacity has been consumed, and even when little or no diluent resin is present. Even further, such films exhibit a relatively high oxygen capacity and, once scavenging has been initiated, they exhibit a relatively high scavenging rate as well.

As indicated earlier, the method of this invention is used in forming scavenging compositions, and layers or articles formed therefrom which comprise transition metal catalysts. While not being bound by any particular theory, preferable catalysts are those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a salt, with the metal thereof selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, oleate, stearate, palmitate, 2-ethylhexanoate, neodecanoate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

It has been found that in order to facilitate reliable initiation of the oxygen scavenging composition, a small amount of a basic substance should be added during the compounding of the components forming the composition. Suitable bases include, but are not limited to, calcium oxide, sodium carbonate, magnesium oxide, hydrotalcite, calcium hydroxide, and magnesium hydroxide. The base should be added in small amounts which do not effect the ability of the resultant composition to be shaped into a film, layer or article suitable for packaging purposes and, preferably, the ability to provide the transparency desired. Thus, the base should be added in amounts ranging from about 0.001% to 1%, preferably from about 0.01% to 0.5% by weight of the scavenging composition. The resultant scavenging composition has the required basic substance, either in its free state or as a complex, uniformly dispersed throughout the polymer matrix of the scavenging composition. The inventors theorize, though not meant to be a limitation on the present invention, that the base reacts with small amounts of acidic by-products which may form during the extrusion process, which are believed to poison the transition metal catalyst.

As will be evident, the method of this invention can improve initiation of oxygen scavenging in a composition, layer or packaging article solely prepared from the oxidizable organic compound and transition metal catalyst without photoinitiator. However, components such as photoinitiators can be added to further facilitate or control the initiation of oxygen scavenging properties. For instance, it is often preferable to add a photoinitiator, or a blend of different photoinitiators, to the compositions used to prepare the oxygen scavenger, especially when antioxidants are included to prevent premature oxidation of that composition.

Suitable photoinitiators are well known to those skilled in the art. Specific examples include, but are not limited to, benzophenone, o-methoxy-benzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, substituted and unsubstituted anthraquinones, α-tetralone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene -7,12-dione, 2,2-dimethoxy-2-phenylacetophenone, α,α- diethoxy-acetophenone, α,α-dibutoxyacetophenone, etc. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone]. Use of a photoinitiator is preferable because it generally provides faster and more efficient initiation. When actinic radiation is used, the initiators may also provide initiation at longer wavelengths which are less costly to generate and less harmful.

When a photoinitiator is used, its primary function is to enhance and facilitate the initiation of oxygen scavenging upon exposure to radiation. The amount of photoinitiator can vary. In many instances, the amount will depend on the oxidizable compounds used, the wavelength and intensity of radiation used, the nature and amount of antioxidants used, as well as the type of photoinitiator used. The amount of photoinitiator also depends on how the scavenging composition is used. For instance, if the photoinitiator-containing composition is placed underneath a layer which is somewhat opaque to the radiation used, more initiator may be needed. For most purposes, however, the amount of photoinitiator, when used, will be in the range of 0.01 to 10% by weight of the total composition.

Antioxidants may be included in the scavenging compositions of this invention to control degradation of the components during compounding and shaping. An antioxidant as defined herein is any material which inhibits oxidative degradation or cross-linking of polymers. Typically, such antioxidants are added to facilitate the processing of polymeric materials and/or prolong their useful lifetime. Although such additives prolong the induction period for oxygen scavenging activity to occur in the absence of irradiation, when the layer's or article's scavenging properties are required, the layer or article (and any incorporated photoinitiator) can be exposed to radiation.

Antioxidants such as 2,6-di(t-butyl)4-methyl-phenol (BHT), 2,2'-methylene-bis(6-t-butyl-p-cresol), triphenylphosphite, tris-(nonylphenyl)phosphite and dilaurylthiodipropionate would be suitable for use with this invention.

When an antioxidant is included as part of the present composition, it should be used in amounts which will prevent oxidation of the scavenger composition's components during formation and processing but the amount should be less than that which would interfere with the scavenging activity of the resultant layer, film or article after initiation has occurred. The particular amount permitted will depend on the particular components of the composition, the particular antioxidant used, the degree and amount of thermal processing used to form the shaped article, and the dosage of radiation applied to initiate induction period and can be determined by conventional means. Typically, they are present in about 0.01 to 1% by weight.

The method of this invention can also be used on oxygen scavenging layers which comprise film-forming diluent polymers. Such polymers are thermoplastic and render the film more adaptable for use as packaging layers. They also may be, to some extent, oxidizable, and thus factored in the oxygen scavenger formulation as an oxidizable organic compound. Suitable diluents include, but are not limited to, polyethylene, low density polyethylene, very low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene-(meth) acrylic acid and ethylene-(meth)acrylic acid ionomers. In rigid articles such as beverage containers PET is often used. Blends of different diluents may also be used. However, the selection of the polymeric diluent largely depends on the article to be manufactured and the end use thereof. Such selection factors are well known in the art. For instance, the clarity, cleanliness, effectiveness as an oxygen scavenger, barrier properties, mechanical properties and/or texture of the article can be adversely affected by a blend containing a diluent polymer which is highly incompatible with the oxidizable organic compound.

Other additives which may also be included in oxygen scavenger layers include, but are not necessarily limited to, fillers, pigments, dyestuffs, stabilizers, processing aids, plasticizers, fire retardants, anti-fog agents, etc.

To prepare oxygen scavenging layers and articles, the desired components thereof are preferably melt-blended at a temperature in the range of 50° C. to 300° C. However, alternatives such as the use of a solvent followed by evaporation may also be employed. The blending may immediately precede the formation of the finished article or preform or precede the formation of a feedstock or masterbatch for later use in the production of finished packaging articles. When the blended composition is used to make film, layers or articles, (co)extrusion, solvent casting, injection molding, stretch blow molding, orientation, thermoforming, extrusion coating, coating and curing, lamination, extrusion lamination or combinations thereof would typically follow the blending.

The amounts of the components which are used in the oxygen scavenging compositions, or layers have an effect on the use, effectiveness and results of this method. Thus, the amounts of oxidizable organic compound, transition metal catalyst and any photoinitiator, antioxidant, polymeric diluents and additives, can vary depending on the article and its end use.

For instance, the primary function of an oxidizable organic compound in the oxygen scavenger is to react irreversibly with oxygen during the scavenging process, while the primary function of the transition metal catalyst is to facilitate this process. Thus, to a large extent, the amount of oxidizable organic compound will affect the oxygen capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the induction period.

The amount of oxidizable organic compound may range from 1 to 99%, preferably from 10 to 99%, by weight of the composition or layer in which both oxidizable organic compound and transition metal catalyst are present (hereinafter referred to as the "scavenging composition", e.g., in a coextruded film, the scavenging composition would comprise the particular layer(s) in which both oxidizable compound and transition metal catalyst components are present together). Typically, the amount of transition metal catalyst may range from 0.001 to 1% (10 to 10,000 ppm) of the scavenging composition, based on the metal content only (excluding ligands, counterions, etc.). In the event the amount of transition metal catalyst is less than 1%, it follows that the oxidizable organic compound, and any diluent or additives, will comprise substantially all of the remainder of the composition.

When one or more diluent polymers are used, those polymers can comprise, in total, as much as 99% by weight of the scavenging composition.

Any further additives employed normally will not comprise more than 10% of the scavenging composition, with preferable amounts being less than 5% by weight of the scavenging composition.

As indicated earlier, the invention can be used as a single scavenging layer or a scavenging layer present in a multi-layer film or in forming other articles for container application. Single layered articles can be prepared by solvent casting or by extrusion. Multilayered articles are typically prepared using coextrusion, coating, lamination or extrusion lamination as taught in U.S. Pat. Nos. 5,350,622 and 5,529,833. The additional layers of a multilayered article may include "oxygen barrier" layers, i.e. those layers of material having an oxygen transmission rate equal to or less than 500 cubic centimeters per square meter per day per atmosphere ($cc/m^2 \cdot d \cdot atm$) at room temperature, i.e. about 25° C. Typical oxygen barriers comprise poly(ethylene/vinylalcohol), poly (vinylalcohol), polyacrylonitrile, polyvinyl chloride, poly (vinylidene dichloride), polyethylene terephthalate, silica, and polyamides such as nylon 6, MXD6, and Nylon 6.6. Copolymers of certain materials described above, and metal foil layers, can also be employed.

Other additional layers may include one or more layers which are permeable to oxygen. In one preferred packaging construction, especially for flexible packaging for food, the layers include, in order starting from the outside of the package to the innermost layer of the package, (i) an oxygen barrier layer, (ii) a scavenging layer, i.e. the scavenging composition as defined earlier, and optionally, (iii) an oxygen permeable layer. Control of the oxygen barrier property of (i) allows a means to regulate the scavenging life of the package by limiting the rate of oxygen entry to the scavenging composition (ii), and thus limiting the rate of consumption of scavenging capacity. Control of the oxygen permeability of layer (iii) allows a means to set an upper limit on the rate of oxygen scavenging for the overall structure independent of the composition of the scavenging composition (ii). This can serve the purpose of extending the handling lifetime of the films in the presence of air prior to sealing of the package. Furthermore, layer (iii) can provide a barrier to migration of the individual components in the scavenging films or by-products of scavenging into the package interior. Even further, layer (iii) also improves the heat-sealability, clarity and/or resistance to blocking of the multilayer film.

Further additional layers such as adhesive layers may also be used. Compositions typically used for adhesive layers include anhydride functional polyolefins and other well-known adhesive layers.

Once the components have been chosen, the present method requires introducing the basic component (c) while compounding the components prior to forming the desired scavenging composition, layer or article. The method of this invention further employs exposing the resultant composition, layer or article to radiation in order to initiate oxygen scavenging. To initiate oxygen scavenging in an oxygen scavenger is defined herein as facilitating scavenging such that the induction period of oxygen scavenging is significantly reduced or eliminated. As indicated above, the induction period is the period of time before the scavenging composition exhibits useful scavenging properties. Further, initiation of oxygen scavenging may also apply to compositions which have an indeterminate induction period in the absence of radiation.

While the exact manner in which oxygen scavenging is initiated is not known, it is believed, without being held to any specific theory, that one or more of the following occurs when the oxygen scavenger is exposed to radiation:

(a) substantial depletion of any antioxidant(s), if present, thus allowing oxidation to proceed;

(b) activation of the transition metal catalyst through a change in the metal's oxidation state and/or its configuration of ligands, thus increasing its effect on scavenging; or (c) a substantial increase in free radical and/or peroxide species present in the system, despite the inhibiting effect of any antioxidant(s) if present or remaining.

The radiation used in this method can be actinic, e.g. ultraviolet or visible light having a wavelength of about 200 to 750 nanometers (nm), and preferably having a wavelength of about 200 to 600 nm and most preferably from about 200 to 400 nm. When employing this method, it is preferable to expose the oxygen scavenger to at least 0.1 Joules per gram of scavenging composition. A typical amount of exposure is in the range of 10 to 200 Joules per gram. The radiation can also be an electron beam radiation at a dosage of about 0.2 to 20 megarads, preferably about 1 to 10 megarads. Other sources of radiation include ionizing radiation such as gamma, x-rays and corona discharge. The radiation exposure is preferably conducted in the presence of oxygen. The duration of exposure depends on several factors including, but not limited to, the amount and type of photoinitiator present, thickness of the layers to be exposed, amount of any antioxidant present, and the wavelength and intensity of the radiation source.

When using oxygen scavenging layers or articles, the exposure to radiation can be during or after the layer or article is prepared. If the resulting layer or article is to be used to package an oxygen sensitive product, exposure can be just prior to, during, or after packaging. However, in any event, radiation exposure is required prior to using the layer or article as an oxygen scavenger. For best uniformity of radiation, the exposure should be conducted at a processing stage where the layer or article is in the form of a flat sheet.

In order to use the method of this invention in the most efficient manner, it is preferable to determine the oxygen scavenging capabilities, e.g. rate and capacity, of the oxygen scavenger. To determine the rate of oxygen scavenging, the time elapsed before the scavenger depletes a certain amount of oxygen from a sealed container is measured. In some instances the scavenger's rate can be adequately determined by placing a film comprising the desired scavenger in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining. Usually, the specific rates obtained will vary under different temperature and atmospheric conditions. The rates indicated below are at room temperature and one atmosphere of air because they best represent the conditions under which, in many instances, the oxygen scavenger and/or layers and articles prepared therefrom will be used.

When an active oxygen barrier is needed, a useful scavenging rate can be as low as 0.05 cc oxygen ($O_2$) per gram of oxidizable organic compound in the scavenging component per day in air at 25° C. and at 1 atmosphere pressure. However, certain compositions, e.g. those containing the ethylenically unsaturated oxidizable organic compounds, have the capability of rates equal to or greater than 0.5 cc oxygen per gram per day, thus making such compositions suitable for scavenging oxygen from within a package, as well as suitable for active oxygen barrier applications. The scavengers comprising ethylenically unsaturated hydrocarbons are capable of more preferable rates equal to or greater than 5.0 cc $O_2$ per gram per day.

Generally, film or layers suitable for use as an active oxygen barrier can have a scavenging rate as low as 1 cc oxygen per square meter per day when measured in air at 25° C. and 1 atmosphere pressure. However, the ethylenically unsaturated hydrocarbon-containing layers are capable of a scavenging rate greater than 10 cc oxygen per square meter per day, and can have an oxygen scavenging rate equal to or greater than about 25 cc oxygen per square meter per day under the same conditions. Such rates make those layers suitable for scavenging oxygen from within a package, as well as suitable for active oxygen barrier applications.

When it is desired to use this method with an active oxygen barrier application, the initiated oxygen scavenging activity, in combination with any oxygen barriers, should create an overall oxygen transmission rate of less than about 1.0 cubic centimeters per square meter per day per atmosphere at 25° C. The oxygen scavenging capacity should be such that this transmission rate is not exceeded for at least two days.

For many commercial applications, it is expected that the scavenging rates be able to establish an internal oxygen level of less than 0.1% in as soon as possible, preferably less than about four weeks' time. See Mitsubishi Gas and Chemical Company, Inc.'s literature titled "AGELESS®"—A New Age in Food Preservation" (date unknown).

Once scavenging has been initiated, the scavenger composition, layer or article prepared therefrom, should be able to scavenge up to its capacity, i.e. the amount of oxygen which the scavenger is capable of consuming before it becomes ineffective. In actual use, the capacity required for a given application depends on:

(1) the quantity of oxygen initially present in the package, (2) the rate of oxygen entry into the package in the absence of the scavenging property, and (3) the intended shelf life for the package.

When using scavengers comprising ethylenically unsaturated compounds, the capacity can be as low as 1 cc oxygen per gram, but can be at least 50 cc oxygen per gram. When such scavengers are in a layer, the layer will preferably have an oxygen capacity of at least 250 cc oxygen per square meter per mil thickness and more preferably at least 1200 cc oxygen per square meter per mil thickness.

EXAMPLES

The following examples illustrate the practice of the present invention without limiting its scope or the scope of the claims which follow. The percentages indicated in the Examples are percentages by weight of the formulation. Comparative Examples 1 and 2 illustrate the detrimental effect that acids can have on initiation of oxygen scavenging.

Comparative Example 1

Two formulations were prepared in a Brabender mixing chamber. Both formulations were composed of 90% RB 830 (1,2-polybutadiene) from Japan Synthetic Rubber and 10% cobalt/benzophenone masterbatch. The masterbatch gives a final concentration of 340 ppm cobalt, and 0.5% benzophenone. To the second formulation (II) was added two drops (about 0.1%) of propionic acid (PA) during compounding. The formulations were pressed into squares (10×10 cm), which were irradiated for 5 minutes with an Amergraph UV unit (about 0.3 mW/cm$^2$ measured by 365 nm). The triggered films were sealed in oxygen barrier bags from W. R. Grace & Co.-Conn., Duncan, S.C.) with 600 cc air. The following results were obtained:

| Time Elapsed (days) | Formulation I., 3.3 g no PA | II., 3.1 g with PA |
|---|---|---|
| 0 | 20.6 | 20.6 |
| 1 | 17.8 | — |
| 3 | — | 20.6 |
| 5 | 8.9 | — |
| 7 | — | 19.8 |
| 12 | 2.12 | — |
| 17 | — | 16.7 |
| 22 | 0.105 | — |
| 24 | — | 16.0 |
| 30 | 0.064 | — |
| 31 | — | 13.0 |

These data clearly show the deleterious effect of a very small amount of propionic acid on the desirable oxygen scavenging properties. These effects occurred even though propionic acid was added to a polymer melt that was near the boiling point of PA (~140° C.)

Comparative Example 2

Two formulations were prepared in a Brabender mixing chamber consisting of 90% 1,2-poly(butadiene) (RB830) and 10% cobalt/benzophenone masterbatch, to give the same amounts of cobalt and benzophenone as in Comparative Example 1. To the second formulation, was added 2% by weight palmitic acid. Films were pressed and irradiated as described in Comparative Example 1, and were sealed in barrier bags (Cryovac® BDF 2001 bags from W. R. Grace & Co.-Conn., Duncan, S.C.) with 130 cc of air. The following results were obtained:

| Time Elapsed (days) | Formulation I., 1.3 g control | II., 1.3 g w/palm. acid |
|---|---|---|
| 0 | 20.6 | 20.6 |
| 1 | 20.6 | 20.6 |
| 7 | 19.5 | 20.6 |
| 15 | 6.7 | 20.6 |
| 23 | 1.48 | 20.6 |
| 35 | 0.000 | 20.6 |
| 65 | — | 20.6 |

These data show that when a completely non-volatile acid is added in higher amounts, the desired scavenging effect is suppressed for very long periods of time.

Example 1

The following three formulations were compounded on a Werner & Pfleiderer twin screw extruder equipped with a powder side stuffer feeder:

I. 50% of a styrene-butadiene-styrene triblock copolymer (Vector® 8508-D of Dexco, Houston, Tex.); 40% of a linear low density polyethylene ("LLDPE"), (Dowlex 2045.04 of Dow Chemical Co., Midland, Mich.); and 10% of a powder side feed consisting of 92% ethylene-vinyl acetate (Quantum MU763 of Quantum Chemical Corp.), 5% benzophenone and 3% cobalt neodecanoate (Ten-Cem of OM Group Inc.).

II. 50% of a styrene-isoprene multiblock copolymer (Vector 4114-D of Dexco); 40% of LLDPE (Dowlex 2045.04); and 10% of a powder side feed consisting of 91% ethylene-vinyl acetate (Quantum MU 763), 5% benzophenone and 3% cobalt neodecanoate (Ten-Cem) and 1% calcium oxide.

III. 50% of a styrene-isoprene multiblock copolymer (Vector 4114-D);
40% of a LLDPE (Dowlex 2045.04); 10% powder side feed consisting of 91.25% ethylene-vinyl acetate (Quantum MU-763), 5% benzophenone, 3% cobalt neodecanoate (Ten-Cem) and 0.75% of a phosphite antioxidant (Irgafos 168 of Ciba Corp.).

These formulations were extruded as strands and pelletized. Pellets of each were analyzed by headspace GC to determine the presence of propionic acid. The following headspace levels of propionic acid were found:

| Formulation | Propionic Acid ($\mu V \cdot Sec$) |
|---|---|
| I | 241000 |
| II | 0 |
| III | 91460 |

It can be seen from these data that a small amount of CaO is capable of removing the propionic acid that is produced during compounding of these formulations, and that antioxidants do not completely prevent the formation of propionic acid.

The data that follow shows that formulation II triggers and scavenges oxygen very well.

Example 2

The following four formulations were compounded and pelletized as above. Each formulation was composed of 50% of a styrene-isoprene multiblock copolymer (Vector 4114-

D); 40% of a linear low density polyethylene ("LLDPE") (Chevron Poly-eth 1017); and 10% of one of the followide side feeds:

I. side feed=92% Quantum MU 763, 5% benzophenone, 3% Cobalt Ten-Cem cobalt (OMG Inc.).

II. side feed=91.5% Quantum MU 763, 5% benzophenone, 3% Ten-Cem cobalt (OMG Inc.), and 0.5% CaO.

III. side feed=91% Quantum MU 763, 5% benzophenone, 3% Ten-Cem cobalt (OMG Inc.), and 1% CaO.

IV. side feed=90% Quantum MU 763, 5% benzophenone, 3% Ten-Cem cobalt (OMG Inc.), and 2% CaO.

The following levels of propionic and acetic acids were found in the by headspace gas chromatography as described above:

Vector 4114-D/LLDPE Blends
With 680 ppm Co, 0.5% Benzophenone

| CaO Level (target ppm) | Propionic Acid ($\mu V \cdot sec$) | Acetic Acid ($\mu V \cdot sec$) |
|---|---|---|
| 0 | 91,800 | 3,820 |
| 500 | 101,000 | — |
| 1000 | 25,000 | — |
| 2000 | 20,100 | — |

These data show that acid levels decrease with CaO level up to a targeted level of about 1000–2000 ppm. Pellets of the above formulations were coextruded into three layer films with the structure: LLDPE/scavenger/LLDPE (1/1/1 mil). Samples 10×10 cm were irradiated for 60 seocnds with an Anderson/Vreeland UV unit in "dual" mode (UVA and UVC lamps). The samples were sealed in barrier bags with 600 cc of air and were refrigerated (4° C.). The following results were obtained after 30 days:

Three-Layer Films, Refrigerated, Air

| Formulation | CaO Level (target ppm) | Average Rate (cc $O_2/m^2 \cdot d$) | Peak Ins. Rate (cc $O_2/m^2 \cdot d$) |
|---|---|---|---|
| I | 0 | 32 | 332 |
| II | 500 | 33 | 307 |
| III | 1000 | 36 | 369 |
| IV | 2000 | 40 | 380 |

Where:
Average Rate = total cc $O_2$ scavenged/(0.02 $m^2 \cdot$ 30 d)
Instantaneous Rate = $\Delta$ cc $O_2$ scav./(0.02 $m^2 \cdot \Delta d$).

The data in the table above reflect the maximum ("peak") instantaneous rate obtained.

These data indicate that average and instantaneous scavenging rates increase with increasing CaO levels, and decreasing acid levels.

Example 3

Two formulations were prepared in a Brabender mixing chamber consisting of 50% Vector 4114-D and 40% LDPE (Chevron Poly-eth 1017) and 10% of cobalt/benzophenone masterbatch (to give 340 ppm cobalt and 0.5% benzophenone). To the second formulation was added 1000 ppm (0.1%) of hydrotalcite (ALCOA Sorbplus® PM). Samples 10×10 cm were pressed and irradiated as in Example 2. These samples were tested at room temperature with 300 cc of air. The following results were obtained:

Vector 4114-D/LDPE Blends, Pressed Films

| Formulation | Hydrotalcite (target ppm) | Average Rate (cc $O_2/m^2 \cdot d$) | Ins. Rate (cc $O_2/m^2 \cdot d$) |
|---|---|---|---|
| I | 0 | 100 | 1,725 |
| II | 1000 | 98 | 2,130 |

These data indicate that the addition of hydrotalcite can significantly increase the peak instantaneous scavenging rate.

What is claimed:

1. An improved method of scavenging oxygen from an interior of a package wherein the package comprises a solid transparent film having at least one layer composed of a composition comprising an oxidizable organic compound and a transition metal catalyst, wherein the method comprises compounding a mixture comprising oxidizable organic compound and transition metal catalyst to form the composition, forming a solid transparent film having at least one layer comprising the composition, and initiating the oxygen scavenging by exposing the film to radiation, the improvement comprising incorporating into the mixture from 0.001 to 1 weight percent, based on the weight percent of the composition, of a base during the compounding step and subsequently exposing the film to radiation of from 200 to 600 nanometers at a dosage of at least 0.1 Joule per gram of scavenging composition, or exposing the film to electron beam at a dosage of 0.2 to 20 megarads.

2. The method of claim 1 wherein the base is added in the range of from 0.001 to 0.5 weight percent based on the weight of composition.

3. The method of claim 1 wherein the radiation is electron beam radiation at a dosage of 1 to 10 megarads.

4. The composition resulting from the method of claim 1.

5. The method of claim 1 wherein the radiation is ultraviolet radiation.

6. The method of claim 1 wherein the base is an inorganic basic compound uniformly dispersed within the matrix of the composition.

7. The method of claim 6 wherein the base is selected from the group consisting essentially of calcium oxide, sodium carbonate, hydrotalcite and magnesium oxide.

8. The method of claim 6 wherein the radiation is ultraviolet radiation.

9. The method of claim 6 wherein the base is added in the range of from 0.001 to 0.5 weight percent based on the weight of the composition.

10. The method of claim 9 wherein the base is selected from the group consisting essentially of calcium oxide, sodium carbonate, hydrotalcite and magnesium oxide.

11. The method of claim 1 wherein the oxidizable organic compound has a molecular weight of at least 1000.

12. The composition resulting from the method of claim 11.

13. The method of claim 11 wherein the radiation is ultra-violet radiation.

14. The method of claim 11 wherein the base is added in the range of from 0.001 to 0.5 weight percent based on the weight of composition.

15. The method of claim 14 wherein the radiation is electron beam radiation at a dosage of 1 to 10 megarads.

16. The composition resulting from the method of claim 14.

17. The method of claim 11 wherein the oxidizable organic compound is a polymeric material having a molecular weight of at least about 10,000.

18. The method of claim 17 wherein the radiation is ultra-violet radiation.

19. The method of claim 17 wherein the radiation is electron beam radiation at a dosage of 1 to 10 megarads.

20. The method of claim 17 wherein the base is added in the range of from 0.001 to 0.5 weight percent based on the weight of the composition.

21. The composition resulting from the method of claim 17.

22. The method of claim 17 wherein the base is selected from the group consisting essentially of calcium oxide, sodium carbonate, hydrotalcite and magnesium oxide.

23. The method of claim 17 wherein the base is an inorganic basic compound uniformly dispersed within the matrix of the composition.

24. The method of claim 23 wherein the radiation is ultra-violet radiation.

25. The method of claim 23 wherein the base is selected from the group consisting essentially of calcium oxide, sodium carbonate, hydrotalcite and magnesium oxide.

26. The method of claim 23 wherein the radiation is electron beam radiation at a dosage of 1 to 10 megarads.

27. The composition resulting from the method of claim 23.

28. The method of claim 23 wherein the base is added in the range of from 0.001 to 0.5 weight percent based on the weight of the composition.

29. The method of claim 28 wherein the base is selected from the group consisting essentially of calcium oxide, sodium carbonate, hydrotalcite and magnesium oxide .

30. The composition resulting from the method of claim 28.

* * * * *